Aug. 19, 1924.
O. R. WIKANDER
ROLLER BEARING
Filed Dec. 28, 1921
1,505,454
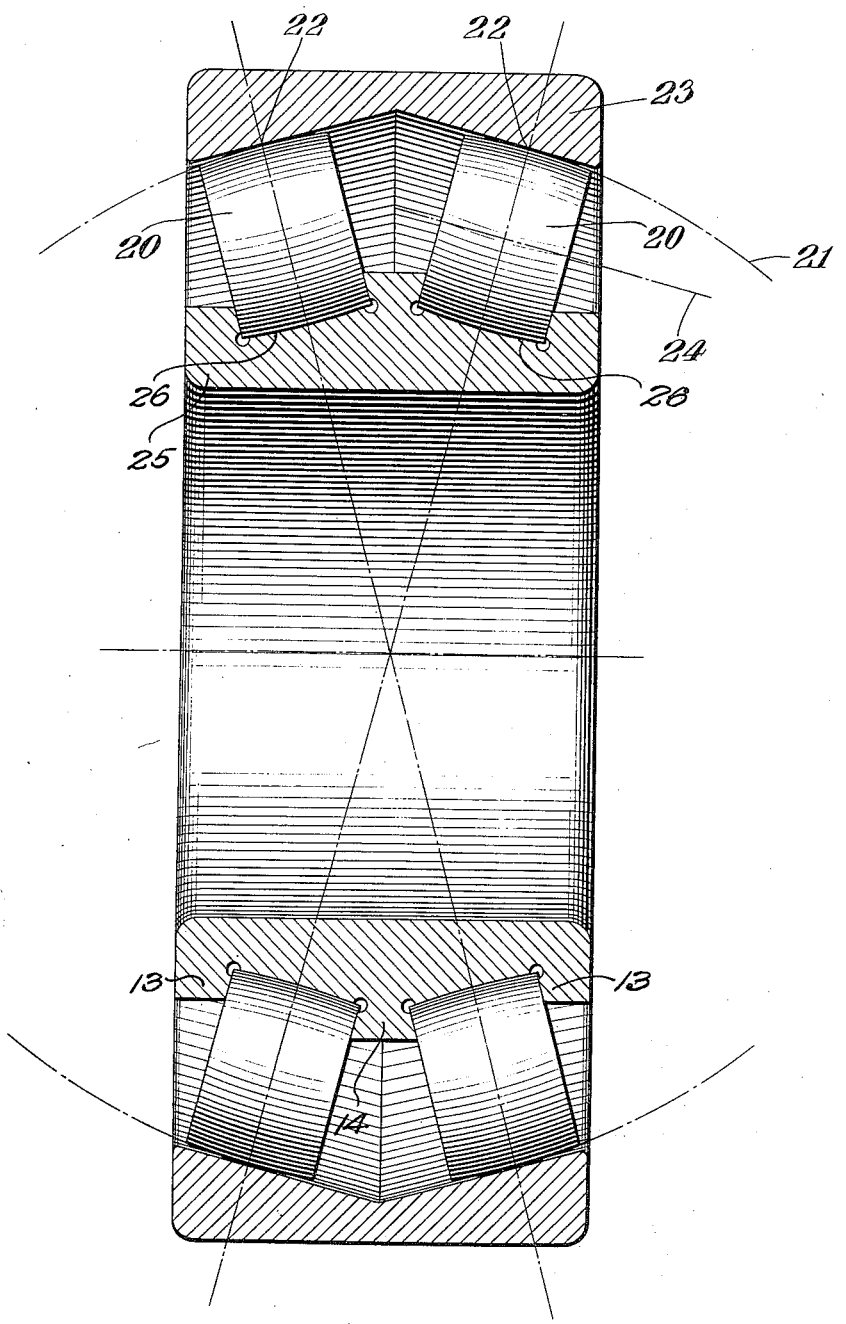
INVENTOR
O.R.Wikander.
BY Rogers, Kennedy Campbell
ATTORNEYS Patented Aug. 19, 1924.

1,505,454

UNITED STATES PATENT OFFICE.

OSCAR RAGNAR WIKANDER, OF GLEN RIDGE, NEW JERSEY, ASSIGNOR TO THE SKAYEF BALL BEARING COMPANY, OF HARTFORD, CONNECTICUT, A CORPORATION OF CONNECTICUT.

ROLLER BEARING.

Application filed December 28, 1921. Serial No. 525,331.

*To all whom it may concern:*

Be it known that I, OSCAR RAGNAR WIKANDER, a citizen of the United States, residing at Glen Ridge, in the county of Essex and State of New Jersey, have invented certain new and useful Improvements in Roller Bearings, of which the following is a specification, reference being had therein to the accompanying drawing.

This invention relates to anti-friction roller bearings, and has for an object to provide a double row roller bearing capable of carrying heavy radial loads and in addition thrust load in either direction.

The bearings to which this invention relates are of the so-called barrel shaped roller variety. The load carrying surface of the rollers is generated by rotating a curved line about the axis of the roller. The radius of curvature of the said line is considerably greater than the radius of the base of the circular cone comprising the roller path on the outer race ring.

In the drawing accompanying this specification an illustrative embodiment of the invention is shown in axial section.

In the illustration there is shown an inner race ring, 25, adapted to be mounted upon a shaft in some suitable manner and provided on its exterior with two roller grooves or raceways, 26, in which there are respectively mounted rows of rollers, the members of which are indicated by the character 20. The axes of the rollers of each row are all located on a cone, the apex of which is situated on the axis of the bearing. The rollers, 20, are generated by the rotation of a curve, 21, (having a radius considerably greater than the radius of the race track, 22, on the outer ring, 23,) about the axis, 24, of the roller. The surface of the roller fits, with line contact, at the bottom of the grooves, 26. The track faces, 22—22, are cones having their faces coinciding with the tangents of the faces of the rollers at the point of contact or at the point of application of the load. The load carrying capacity is increased by producing a close osculation between the roller and the outer race at the point of contact or area of contact. As this osculation increases in closeness the freedom of relative tilting or self-alignment decreases. With even a very slight clearance, or otherwise expressed, a very close osculation, there is permitted, as is well known to those familiar with ball and roller bearings, a slight amount of relative tilting of the parts without injurious results even in those forms of bearings which were not originally designed for accommodating shaft misalignment.

On account of the symmetrical shape of the roller around its transversal central plane and due to the fact that the force of reaction from the outer race is in a radial direction along said plane, it follows that the roller is not subject to any thrust pressure, as is the case in known designs of similar bearings, in which the rollers are conical in shape. There is, however, a certain tendency of skewing, which tendency is counteracted by the fact that the rollers are guided by flanges 13—13 and 14.

I claim as my invention:

1. In a roller bearing, the combination with an outer member having a hollow conical raceway, of an inner member provided with a concave groove and a row of rollers mounted in said groove, the load carrying surface of each of the said rollers being generated by rotating about its axis a curved line of considerably greater radius of curvature than the radius of curvature of the circular conical surface comprising the roller path on the outer race member.

2. In a roller bearing, the combination with an outer member having a pair of hollow conical raceways, of an inner member provided with a pair of concave grooves, and a row of rollers mounted in each said groove, the load carrying surface of each of the said rollers being generated by rotating about its axis a curved line of considerably greater radius of curvature than the radius of curvature of the circular conical surfaces comprising the roller paths on the outer race member.

In testimony whereof, I have affixed my signature hereto.

OSCAR RAGNAR WIKANDER.